(12) United States Patent
Leikin et al.

(10) Patent No.: US 11,378,518 B2
(45) Date of Patent: Jul. 5, 2022

(54) ANALYTICAL NEBULIZER

(71) Applicant: Texas Scientific Products LLC, Justin, TX (US)

(72) Inventors: Sergei Leikin, Centerville, MA (US); Steven D. Sweat, Cedaredge, CO (US)

(73) Assignee: Texas Scientific Products LLC, Justin, TX (US)

( * ) Notice: Subject to any disclaimer, the term of this patent is extended or adjusted under 35 U.S.C. 154(b) by 0 days.

(21) Appl. No.: 17/152,741

(22) Filed: Jan. 19, 2021

(65) Prior Publication Data

US 2021/0285885 A1 Sep. 16, 2021

Related U.S. Application Data

(60) Provisional application No. 62/963,016, filed on Jan. 18, 2020.

(51) Int. Cl.
  *G01N 21/71* (2006.01)
  *H01J 49/10* (2006.01)
  *G01N 21/31* (2006.01)

(52) U.S. Cl.
  CPC ....... *G01N 21/714* (2013.01); *G01N 21/3103* (2013.01); *H01J 49/105* (2013.01)

(58) Field of Classification Search
  CPC . G01N 21/3103; G01N 21/714; H01J 49/105; B05B 7/064
  See application file for complete search history.

(56) References Cited

U.S. PATENT DOCUMENTS

| | | | | |
|---|---|---|---|---|
| 4,880,164 A | * | 11/1989 | Noordermeer | B05B 7/08 239/423 |
| 5,411,208 A | * | 5/1995 | Burgener | B01F 3/04049 239/314 |
| 5,884,846 A | * | 3/1999 | Tan | B05B 7/0475 239/338 |
| 6,032,876 A | * | 3/2000 | Bertsch | B05B 5/0255 239/418 |
| 6,511,850 B1 | * | 1/2003 | Vigh | B05B 7/0408 204/452 |

(Continued)

FOREIGN PATENT DOCUMENTS

| | | | | |
|---|---|---|---|---|
| CS | | 245752 B2 * 10/1986 | | B05B 7/0458 |
| JP | | 2011196697 A * 10/2011 | | |
| KR | | 101151165 B1 * 6/2012 | | |

*Primary Examiner* — Sang H Nguyen
(74) *Attorney, Agent, or Firm* — Hojka Qadeer, LLC

(57) ABSTRACT

A nebulizer having a gas capillary and a liquid capillary that are aligned in the same direction within a nebulizer housing is disclosed. The nebulizer includes a nebulizer tip that is substantially parallel to a cross-section of the liquid capillary and to a cross-section of the gas capillary. The tip includes a liquid opening and a gas orifice. The gas capillary may have a non-tapered body and a tapered end. The tip has a roughened surface that allows wetting of the tip with liquid that exits from the liquid opening to form a thin film. The nebulizer may be formed from glass, quartz, one or more polymers, metals, or alloys, or a combination thereof. The nebulizer is capable of handling high solid content samples, and it also offers precision and sensitivity comparable to concentric nebulizers. Methods of introducing a sample into an instrument using the disclosed nebulizer are also disclosed.

20 Claims, 8 Drawing Sheets

(56) References Cited

U.S. PATENT DOCUMENTS

| | | | | |
|---|---|---|---|---|
| 6,634,572 | B1* | 10/2003 | Burgener | B05B 7/0416 |
| | | | | 239/418 |
| 6,859,272 | B2* | 2/2005 | Rutzke | H01J 49/04 |
| | | | | 239/423 |
| 7,141,788 | B2* | 11/2006 | Hirabayashi | H01J 49/0404 |
| | | | | 250/288 |
| 2007/0221582 | A1* | 9/2007 | Holland | B01D 53/90 |
| | | | | 210/748.01 |
| 2020/0360944 | A1* | 11/2020 | Ros | B05B 7/0408 |

* cited by examiner

ANALYTICAL NEBULIZER

CROSS-REFERENCE TO RELATED APPLICATIONS

This application claims the benefit of and priority to U.S. Provisional Patent Application Ser. No. 62/963,016, filed on Jan. 18, 2020, the disclosure of which is incorporated herein in its entirety by reference.

BACKGROUND

Field of the Invention

The present disclosure relates to nebulizers for analytical use.

Description of the Related Art

A nebulizer is an apparatus that converts a liquid into a fine mist. An analytical nebulizer is designed to deliver a fine mist to introduce a sample into the detection system of a spectrometric instrument. Analytical nebulizers are the preferred apparatus for sample introduction in various types of spectroscopy, including inductively coupled plasma atomic emission spectroscopy (ICP-AES), inductively coupled plasma mass spectrometry (ICP-MS), and atomic absorption spectroscopy (AAS).

Analytical nebulizers generally provide a consistent and reproducible method of sample introduction. A sample must be in liquid form before it is introduced into a nebulizer. Solid samples may be dissolved in an appropriate solvent, digested in acid, or suspended in a liquid carrier. An important consideration for analytical nebulizer design is the size of the droplets generated. Smaller droplets lead to increased signal, and larger droplets must be removed before introduction of the mist into the detection chamber of a spectroscopic instrument. Thus, analytical nebulizers that generate a higher percentage of small droplets generally lead to increased signal intensity and thereby provide superior performance. In addition, analytical nebulizers will preferably produce consistent results over time without requiring frequent cleaning, and such long-term stability of results is another measure of nebulizer performance.

Nebulizer designs include both pneumatic and ultrasonic designs. Pneumatic nebulizers may use induction to draw liquid into a gas stream or may alternatively not require induction to draw liquid into a gas stream. Pneumatic induction nebulizers include concentric, cross flow, entrained, Babington and V-groove, and parallel path designs. Pneumatic non-induction nebulizers include enhanced parallel path, Hildebrand grid, and flow blurring designs. Ultrasonic nebulizers include vibrating transducer and vibrating mesh designs.

Pneumatic induction nebulizers generally operate in the following manner, relying on the Venturi effect to draw liquid into a gas stream. Gas at a higher pressure exits from a small orifice into gas at a lower pressure and forms a gas stream in the lower pressure zone. This pushes the lower pressure gas away from the orifice and generates gas flow in the lower pressure gas zone. This in turn draws some of the lower pressure gas into the higher pressure gas stream. The draw of the lower pressure gas creates lower pressure at the orifice. This creates considerable suction at the orifice, the extent of which depends on the differential pressures, the size of the orifice, and the shape of the orifice and surrounding apparatus. In some nebulizer designs, suction near the orifice is used to draw the liquid into the gas stream, and the liquid breaks apart into small droplets in the process. In other nebulizer designs, the liquid is pumped into the gas stream and the liquid then breaks apart into small droplets. The liquid may be pumped using, for example, a peristaltic pump.

Concentric nebulizers use a central capillary with a liquid and an outer capillary with a gas, or alternatively a central capillary with a gas and an outer capillary with a liquid. The gas draws the liquid into the gas stream via suction, and the liquid breaks apart into a fine mist as it moves into the gas stream. Concentric nebulizers are generally designed with a central liquid capillary. Concentric nebulizers typically generate a fine mist suitable for use with spectroscopic instruments and thereby generally provide good analytical sensitivity and precision. However, the general design features of concentric nebulizers also present various drawbacks. The most significant drawback associated with the use of a concentric nebulizer is that the inner diameter of the liquid capillary must be small, which frequently results in at least partial plugging of the liquid capillary and concomitant partial plugging of the outer gas capillary. This both reduces effectiveness of the nebulizer and introduces inconsistency in its performance.

Cross flow nebulizers use a gas capillary that is set perpendicular to a liquid capillary. Gas flows across the liquid capillary to produce a low pressure that draws the liquid into the gas stream. The suction is typically similar to the suction produced in a concentric nebulizer. Cross flow nebulizers allow for use of a liquid capillary with a larger inner diameter than is used in concentric nebulizers. This allows more particles to pass through the capillary without plugging the nebulizer. However, this also results in a mist that is generally not as fine or consistent as the mist generated using a concentric nebulizer.

Entrained nebulizers use a method of generating atomized liquid particles that involves mixing gas and liquid within the system and emitting a combined liquid-gas flow.

Babington and V-groove nebulizers are both similar to cross flow nebulizers in that liquid is delivered perpendicular to a gas capillary. However, in Babington and V-groove nebulizers, liquid flows downward on account of gravity and past a gas orifice. In the Babington design liquid flows down an inclined sheet, and in the V-groove design liquid flows downward through a V-shaped groove. The gas exiting the orifice creates induction to draw the liquid into the gas flow and form a fine mist. These designs eliminate the need for a small inner diameter liquid capillary and are thus typically more resistant to plugging. Both the Babington and V-groove designs use pumping to feed the liquid into the device and then rely on gravity to draw liquid toward the gas orifice. For Babington and V-groove nebulizers to work properly, the inclined sheet or groove must have the correct orientation. Otherwise the liquid will not flow past the gas stream and no induction and subsequent atomization of the liquid will occur. In addition, the droplets generated using Babington and V-groove nebulizers are generally larger than the droplets produced by concentric and cross flow nebulizers. V-groove droplets are also less consistent. Further, in the Babington design, most of the liquid will not be pulled into the gas flow and thus will be wasted. Thus, typical Babington nebulizers only work well with liquids that have low surface tension.

Parallel path nebulizers use parallel gas and liquid capillaries. At the tip of the nebulizer, liquid is pulled into the gas stream by induction to generate a mist. This requires close proximity between the liquid capillary opening and gas orifice.

Enhanced parallel path nebulizers also use parallel gas and liquid capillaries. However, unlike in parallel path nebulizers, liquid is not simply pulled into a gas stream by induction. Rather, a spout extends into the gas stream and liquid is pulled into the gas stream by surface tension along the spout. The liquid interacts with the gas at the center of the gas stream where the velocity of the gas is highest. This produces direct energy transfer from the gas to the liquid, and thereby generates a mist with small droplets.

Hildebrand grid nebulizers use a gas stream that flows through a liquid upon exiting an orifice. To distribute the liquid, two platinum grids are situated in front of the orifice. When the gas stream impacts the liquid in the grid, turbulence is generated and a mist is formed. Droplet sizes are similar to concentric nebulizers. However, the use of platinum grids requires extended rinsing between samples to reduce carryover between samples. In addition, platinum strongly absorbs certain elements and compounds, which further limits the utility of Hildebrand grid nebulizers.

Flow blurring nebulizers use a liquid capillary surrounded by a gas capillary, as in concentric nebulizers. However, turbulence in the liquid capillary causes the liquid contained therein to break apart before it interacts with the gas stream exiting the gas capillary. This results in a high percentage of small droplets and higher sensitivity than standard concentric nebulizers. However, turbulence is inconsistent by nature, and thus flow blurring nebulizers have less long-term stability than other designs.

Ultrasonic nebulizers use high frequency vibrating transducers to impart energy to liquid samples. This leads to efficient energy transfer and small droplet sizes. However, ultrasonic nebulizers are expensive, require periodic transducer replacement, and are not effective for use with high salt samples or small samples.

Each of the nebulizer designs described provides various advantages and drawbacks. In particular, samples that cause plugging of existing designs still provide challenges. Thus, there remains a need for a nebulizer that overcomes the limitations of existing nebulizer designs.

SUMMARY

A thin film induction nebulizer is disclosed herein. The disclosed nebulizer has a gas capillary and a liquid capillary that are aligned in the same direction within a nebulizer housing and are substantially aligned with a main axis of the nebulizer housing. The nebulizer includes a nebulizer tip that is substantially parallel to a cross-section of the liquid capillary and substantially parallel to a cross-section of the gas capillary. The nebulizer tip has a liquid opening configured to allow liquid to exit the liquid capillary and a gas orifice configured to allow gas to exit the gas capillary. In some preferred embodiments, the gas capillary has a non-tapered body and a tapered end, where the tapered end is configured to generate increased gas pressure at the gas orifice compared to the gas pressure within the body. The nebulizer tip has a roughened surface. In some preferred embodiments, the nebulizer may be formed from glass or quartz. In some alternate embodiments, the nebulizer may be formed from one or more polymers such as plastic materials. In other alternate embodiments, the nebulizer may be formed from one or more metals or alloys. In still other alternate embodiments, the nebulizer may be formed from a combination of two or more of glass, quartz, polymers, metals, and alloys.

The roughened surface of the nebulizer tip allows wetting of the nebulizer tip with liquid that exits from the liquid opening. The liquid forms a thin film on the nebulizer tip upon exiting the liquid opening. It is postulated that this thin film is localized on the nebulizer tip and does not typically spread across the entire surface of the nebulizer tip. The smallest distance between the edge of the liquid opening and the edge of the gas orifice may preferably be sufficiently large such that there is no suction from the liquid opening that draws liquid directly into a gas stream exiting from the gas orifice. This distance is preferably still sufficiently small that the wetted nebulizer tip delivers liquid to the gas orifice that is drawn into the gas stream exiting the gas orifice by induction.

The disclosed nebulizer is capable of handling high solid content samples, and it also offers precision and sensitivity comparable to concentric nebulizers.

BRIEF DESCRIPTION OF THE DRAWINGS

The figures provided herewith are intended to illustrate but not to limit the invention.

DETAILED DESCRIPTION OF THE ILLUSTRATED EMBODIMENTS

Figure 1:
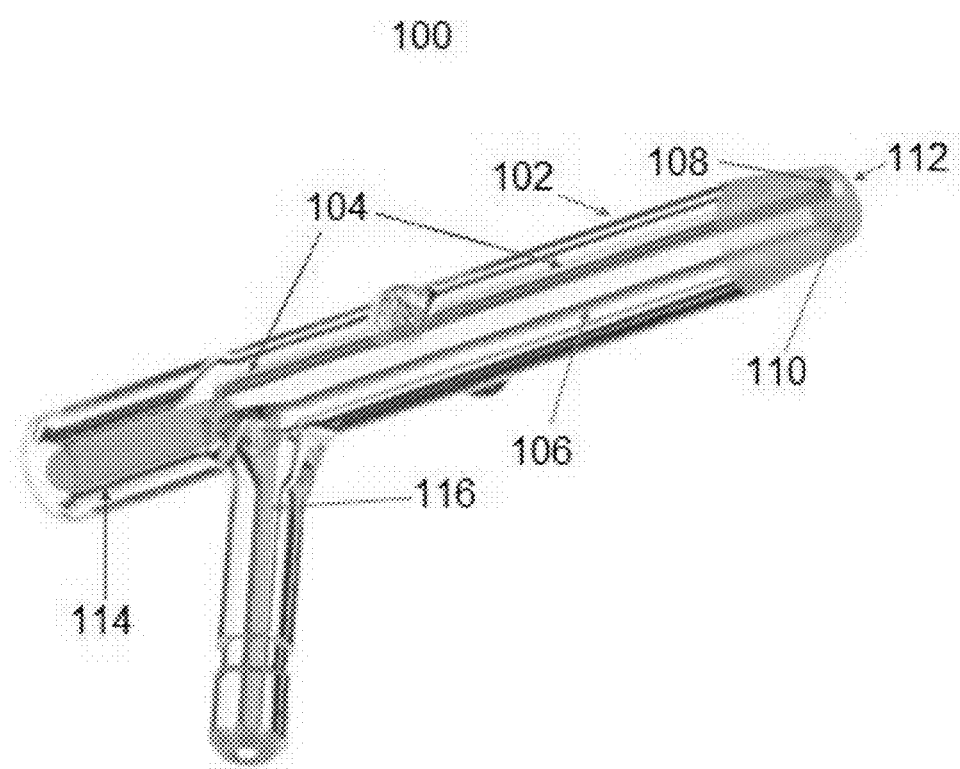
FIG. 1 shows an embodiment of the disclosed nebulizer.

A thin film induction nebulizer is disclosed herein. The disclosed nebulizer has a gas capillary and a liquid capillary that are aligned in the same direction within a nebulizer housing and are substantially aligned with a main axis of the nebulizer housing. The nebulizer includes a nebulizer tip that is substantially parallel to a cross-section of the liquid capillary and is also substantially parallel to a cross-section of the gas capillary. The nebulizer tip has a liquid opening configured to allow liquid to exit the liquid capillary and a gas orifice configured to allow gas to exit the gas capillary. In some preferred embodiments, the gas capillary has a non-tapered body and a tapered end, where the tapered end is configured to generate increased gas pressure at the gas orifice compared to the gas pressure within the body. The nebulizer tip has a roughened surface. In some preferred embodiments, the nebulizer may be formed from glass or quartz. In some alternate embodiments, the nebulizer may be formed from one or more polymers such as plastic materials. In other alternate embodiments, the nebulizer may be formed from one or more metals or alloys. In still other alternate embodiments, the nebulizer may be formed from a combination of two or more of glass, quartz, polymers, metals, and alloys.

The roughened surface of the nebulizer tip allows wetting of the nebulizer tip with liquid that exits from the liquid opening. The liquid forms a thin film on the nebulizer tip upon exiting the liquid opening. It is postulated that this thin film is localized on the nebulizer tip and does not typically spread across the entire surface of the nebulizer tip. The smallest distance between the edge of the liquid opening and the edge of the gas orifice may preferably be sufficiently large such that there is no suction from the liquid opening that draws liquid directly into a gas stream exiting from the gas orifice. This distance is preferably still sufficiently small that the wetted nebulizer tip delivers liquid to the gas orifice that is drawn into the gas stream exiting the gas orifice by induction.

When the distance between the edge of the liquid opening proximal to the gas orifice and the edge of the gas orifice proximal to the liquid opening is sufficiently large that liquid in the liquid capillary will exit the liquid capillary and form a thin film on a portion of the tip when a gas stream is exiting from the gas orifice, the liquid will not be drawn into the gas stream by suction. Rather, the liquid that has formed a thin film on the nebulizer tip will be drawn into the gas stream by induction. The required minimum distance between the edge of the liquid opening proximal to the gas orifice and the edge of the gas orifice proximal to the liquid opening will depend on the size of the meniscus formed. This will depend on the surface tension of the liquid, which will vary depending on what the liquid is.

In some embodiments, the liquid capillary and gas capillary may be substantially parallel.

FIG. 1 shows an embodiment 100 of the disclosed nebulizer. Nebulizer 100 includes a liquid capillary 102 and a gas capillary 104 aligned in the same direction and enclosed within a nebulizer housing 106. Nebulizer housing 106 ends at a nebulizer tip 108. At the nebulizer tip 108, the liquid capillary 102 terminates in a liquid opening 110 and the gas capillary terminates in a gas orifice 112. A liquid sample may be introduced into the nebulizer via a liquid introduction chamber 114 and a gas may be introduced into the nebulizer via a gas introduction chamber 116.

Figure 2:
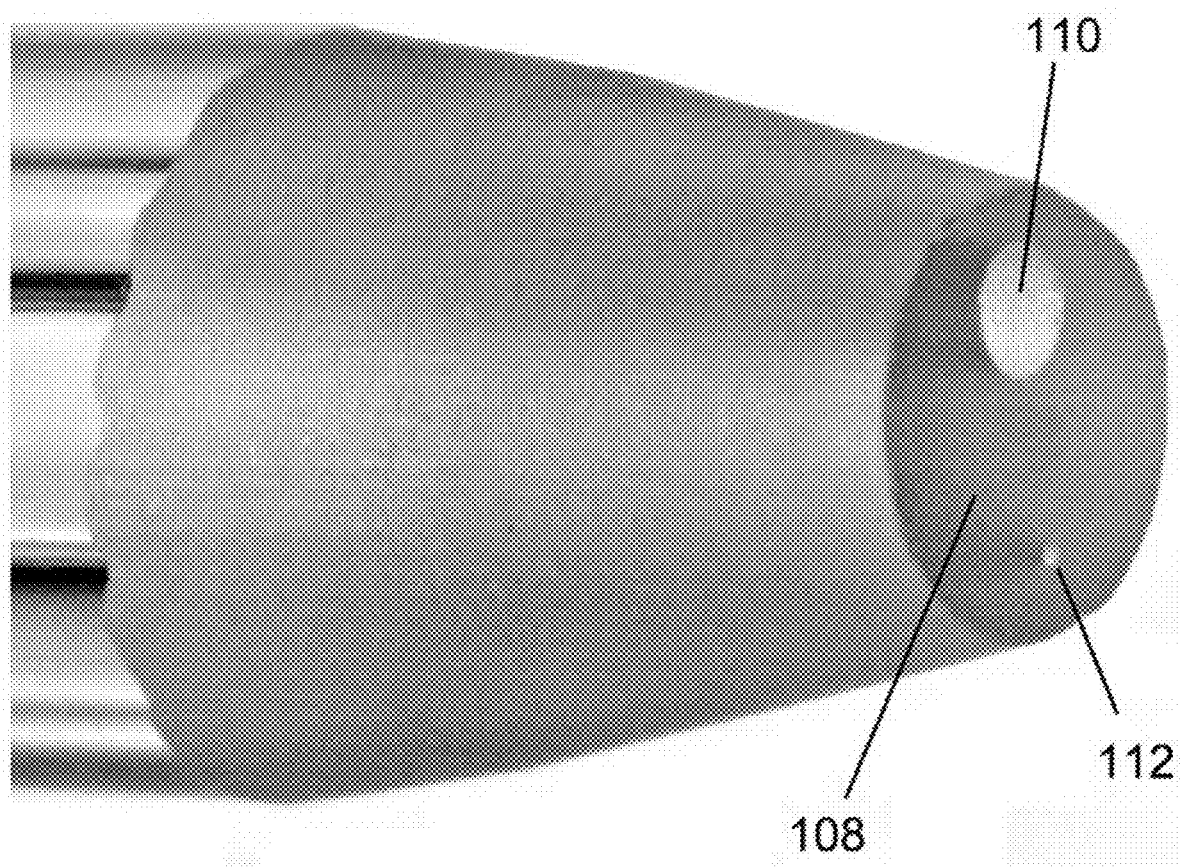
FIG. 2 shows an enlarged angled view of the distal end of the embodiment shown in FIG. 1.

FIG. 2 shows an enlarged angled view of the distal end of nebulizer 100, showing nebulizer tip 108, liquid opening 110, and gas orifice 112.

Figure 3:
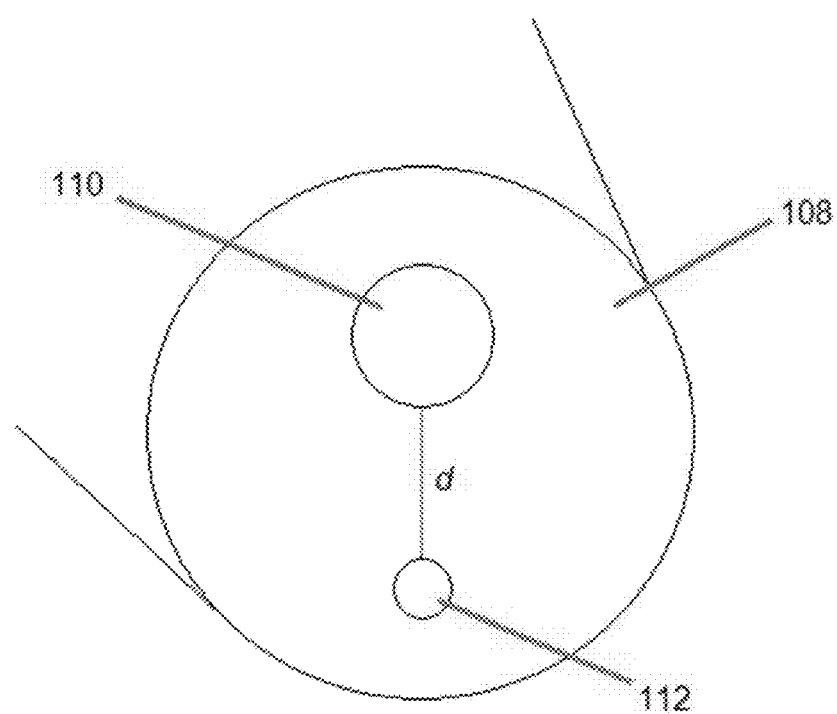
FIG. 3 illustrates an enlarged front view of the distal end of the embodiment shown in FIG. 1.

FIG. 3 illustrates an enlarged front view of the distal end of nebulizer 100, showing the distance d between the edge of the liquid opening 110 proximal to the gas orifice and the edge of the gas orifice 112 proximal to the liquid opening.

Figure 4:
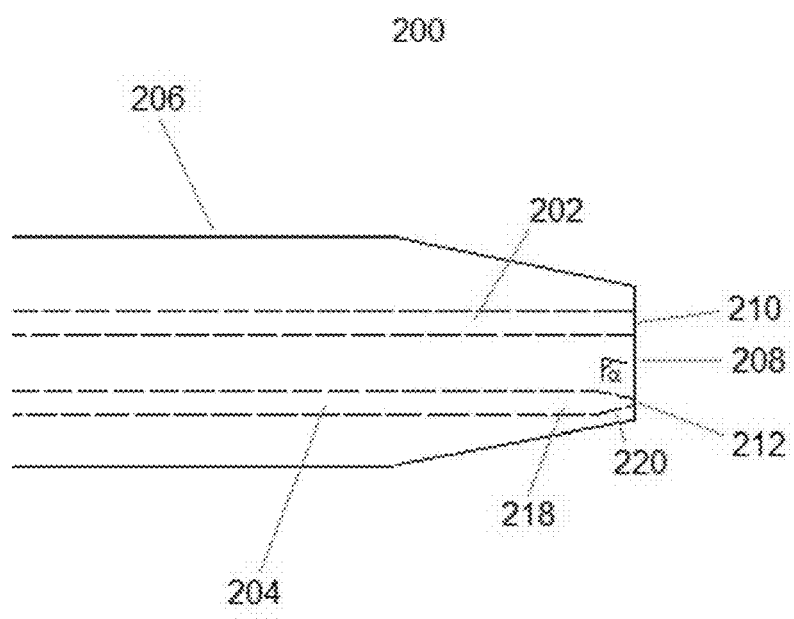
FIG. 4 illustrates a side view of an embodiment of the disclosed nebulizer.

FIG. 4 illustrates a side view of an embodiment 200 of the disclosed nebulizer. Nebulizer 200 includes a liquid capillary 202 and a gas capillary 204 aligned in the same direction and enclosed within a nebulizer housing 206. Nebulizer housing 206 ends at a nebulizer tip 208. At the nebulizer tip 208, the liquid capillary 202 terminates in a liquid opening 210 and the gas capillary 204 terminates in a gas orifice 212. The gas capillary 204 includes a non-tapered body 218 and a tapered end 220. The tapered end 220 is tapered at an angle $\alpha$.

When a gas is introduced via the gas capillary, the tapered end of the gas capillary causes the velocity of the gas to increase as compared to the velocity of the gas within the body of the gas capillary. The high velocity gas exits the gas capillary via the gas orifice as a gas stream and generates induction near the gas orifice in accordance with the Venturi effect. The higher velocity of the gas leads to increased induction. In addition, the higher velocity of the gas also corresponds to increased kinetic energy, which leads to increased atomization of the liquid drawn into the gas stream.

The performance characteristics of nebulizers having tapered-end capillaries have been compared to the performance characteristics of nebulizers having non-tapered flat-end capillaries. See, e.g., Geertsen, V., et al. "Influence of Design and Operating Parameters of Pneumatic Concentric Nebulizer on Micro-Flow Aerosol Characteristics and ICP-MS Analytical Performances," *J. Anal. At. Spectrom.* 2012, 27, 146. However, the comparisons are focused on the presence or absence of a tapered end at the end of a capillary, and not the abruptness of the tapering. Standard methods of fabricating nebulizers that have a tapered-end gas capillary from materials such as glass, quartz, and polymers typically generate a tapered end that has relatively gradual tapering. As a result, existing nebulizers that include a tapered-end gas capillary have relatively gradual tapering. Initial designs of embodiments of the disclosed nebulizer also included a tapered-end gas capillary with relatively gradual tapering. These embodiments became available as the first generation of OptiMist XL® nebulizers. It has subsequently been observed by the inventors of the present application that increased abruptness of the tapering at the end of the gas capillary provides superior results with respect to both induction and subsequent atomization of liquid drawn into the gas stream by induction. The inventors of the present application have found that abrupt tapering at the end of the gas capillary generates an improvement in efficiency of approximately 15-20% as compared to the analogous design with gradual tapering.

In embodiments such as the embodiment shown in FIG. 4, the tapered end may preferably extend 0.1-6.0 mm from the non-tapered body of the gas capillary to the gas orifice, more preferably may extend 0.25-2.5 mm from the non-tapered body of the gas capillary to the gas orifice, and even more preferably may extend 0.25-1.0 mm from the non-tapered body of the gas capillary to the gas orifice.

In embodiments such as the embodiment shown in FIG. 4, the inner diameter of the gas orifice may preferably be 0.10-0.25 mm, and more preferably may be 0.15-0.20 mm.

In embodiments such as the embodiment shown in FIG. 4, the angle (u) of the taper may preferably be 3.0-89 degrees, and more preferably may be 34-54 degrees.

In embodiments such as the embodiment shown in FIG. 4, the inner diameter of the non-tapered body of the gas capillary may preferably be 0.50-4.0 mm, and more preferably may be 0.80-3.5 mm.

Figure 5A:
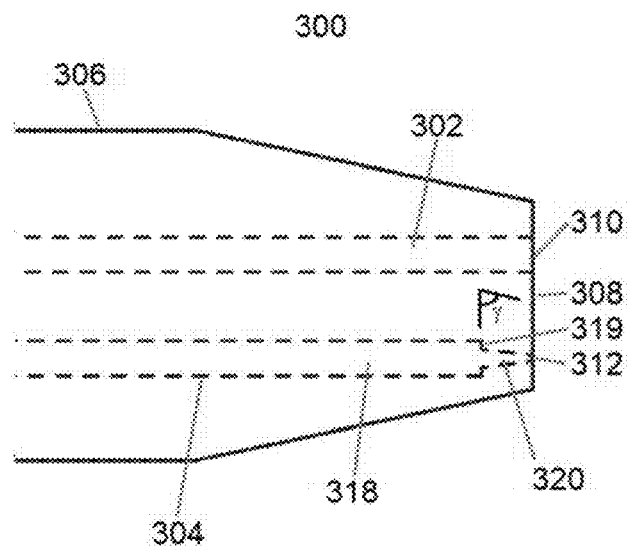
FIGS. 5A-5C illustrate side views of alternate embodiments of the disclosed nebulizer.
Figure 5B:
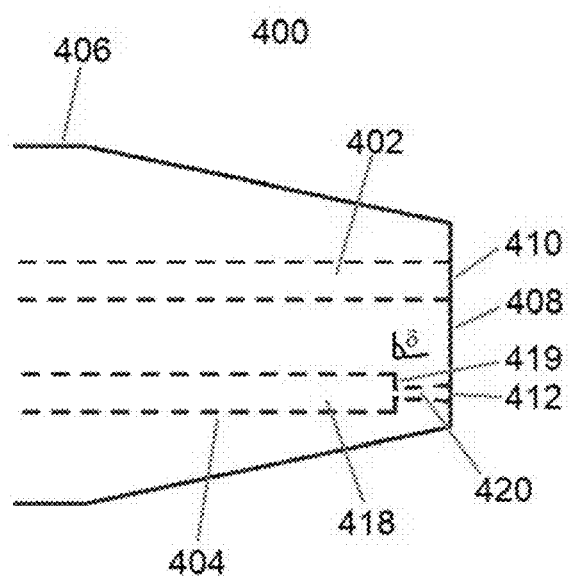
Figure 5C:
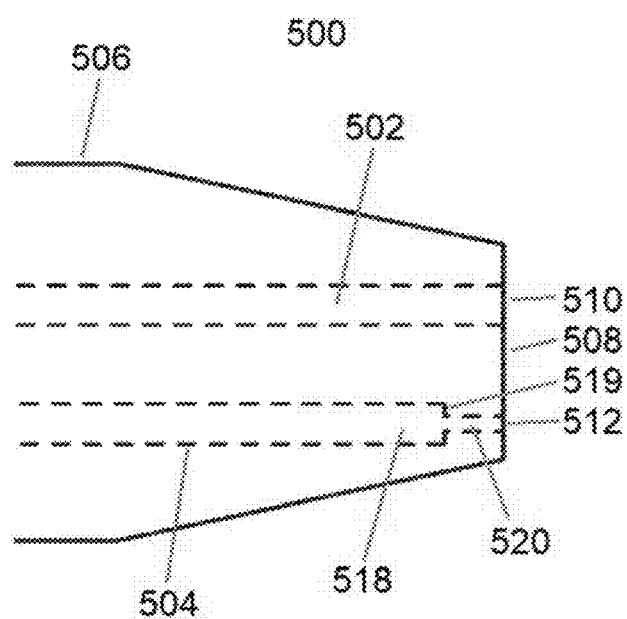

FIGS. 5A-5C show side views of alternate embodiments 300, 400, and 500 of the disclosed nebulizer.

FIG. 5A shows a nebulizer 300 that includes a liquid capillary 302 and a gas capillary 304 aligned in the same direction and enclosed within a nebulizer housing 306. Nebulizer housing 306 ends at a nebulizer tip 308. At the nebulizer tip 308, the liquid capillary 302 terminates in a liquid opening 310 and the gas capillary 304 terminates in a gas orifice 312. The gas capillary 304 includes a non-tapered body 318, and a tapered end 320, where there is an abrupt decrease in diameter at the interface 319 between the non-tapered body 318 and the tapered end 320. The interface 319 between the non-tapered body 318 and the tapered end 320 is a surface that is substantially perpendicular to the direction of gas flow through the non-tapered body 318. The tapered end 320 is tapered at an angle $\gamma$.

FIG. 5B shows a nebulizer 400 that includes a liquid capillary 402 and a gas capillary 404 aligned in the same direction and enclosed within a nebulizer housing 406. Nebulizer housing 406 ends at a nebulizer tip 408. At the nebulizer tip 408, the liquid capillary 402 terminates in a liquid opening 410 and the gas capillary 404 terminates in a gas orifice 412. The gas capillary 404 includes a non-tapered body 418, and a reverse-tapered end 420, where there is an abrupt decrease in diameter at the interface 419 between the non-tapered body 418 and the reverse-tapered end 420. The interface 419 between the non-tapered body 418 and the reverse-tapered end 420 is a surface that is substantially perpendicular to the direction of gas flow through the non-tapered body 418. The reverse-tapered end 420 is tapered at an angle δ.

FIG. 5C shows a nebulizer 500 that includes a liquid capillary 502 and a gas capillary 504 aligned in the same direction and enclosed within a nebulizer housing 506. Nebulizer housing 506 ends at a nebulizer tip 508. At the nebulizer tip 508, the liquid capillary 502 terminates in a liquid opening 510 and the gas capillary 504 terminates in a gas orifice 512. The gas capillary 504 includes a non-tapered body 518, and a narrower non-tapered end 520, where there is an abrupt decrease in diameter at the interface 519 between the non-tapered body 518 and the non-tapered end 520. The interface 519 between the non-tapered body 518 and the non-tapered end 520 is a surface that is positioned substantially perpendicular to the direction of gas flow through the non-tapered body 518.

In embodiments such as the embodiments shown in FIGS. 5A-5C, the end of the gas capillary may preferably extend 0.1-6.0 mm from the non-tapered body of the gas capillary to the gas orifice, more preferably may extend 0.25-2.5 mm from the non-tapered body of the gas capillary to the gas orifice, and even more preferably may extend 0.25-1.0 mm from the non-tapered body of the gas capillary to the gas orifice.

In embodiments such as the embodiments shown in FIGS. 5A-5C, the inner diameter of the gas orifice may preferably be 0.10-0.25 mm, and more preferably may be 0.12-0.18 mm.

In embodiments such as the embodiment shown in FIG. 5A, the inner diameter of the end of the gas capillary at the interface with the non-tapered body of the gas capillary may preferably be 0.15-0.35 mm, and more preferably may be 0.20-0.25 mm.

In embodiments such as the embodiment shown in Figure 5B, the inner diameter of the end of the gas capillary at the interface with the non-tapered body of the gas capillary may preferably be 0.05-0.20 mm, and more preferably may be 0.08-0.12 mm.

In embodiments such as the embodiments shown in FIGS. 5A-5C, the inner diameter of the non-tapered body of the gas capillary may preferably be 0.80-4.0 mm, and more preferably may be 0.90-3.5 mm.

The roughened surface of the nebulizer tip generates increased surface tension, which causes liquid exiting the liquid opening to wet the surface of the nebulizer tip. It is postulated that the thin film forms in a ribbon-like pattern that is approximately the same width as the diameter of the liquid opening near the liquid opening. The ribbon-like film narrows as it flows downward toward the gas orifice and has approximately the same width as the diameter of the gas orifice near the gas orifice. This is on account of induction drawing the thin film of liquid toward the gas orifice. Because the thin film does not extend beyond the diameter of the gas orifice, all of the liquid exiting the liquid opening is drawn into the gas stream that exits the gas orifice by induction and is subsequently atomized within the gas stream. This is a significant improvement over the thin films formed using the Babington design, as the disclosed nebulizer does not waste any of the liquid that exits from the liquid opening.

In some embodiments, the surface of the nebulizer tip may be roughened using a grinder with a sandpaper or diamond grit paper pad attached thereto. A grinder may be particularly suitable for use in roughening the nebulizer tip for embodiments of the disclosed nebulizer comprising glass or quartz. Use of a grinder facilitates consistent roughening that enhances consistency in the performance of the nebulizer and also allows the roughness of the surface to be optimized for optimum performance.

In some other embodiments, the surface of the nebulizer tip may be roughened using a file or another suitable apparatus for scoring a surface.

In some embodiments, a peristaltic pump may be used to pump liquid through the liquid capillary. The thickness of the thin film may vary during the pumping cycles. As discussed above, it has been observed that all of the liquid exiting the liquid opening is drawn into the gas stream by induction. It is postulated that as long as the nebulizer tip is smaller than the size of the droplets of liquid that would be formed in air, the surface will bulge and flatten as the liquid flow pulses during pumping but will remain as a localized thin film on the nebulizer tip and will not fall off as droplets. As a result, pump surges will not affect the induction near the gas orifice. This explains the observation that all of the liquid that exits the liquid opening is drawn into the gas stream and then atomized. Because all of the liquid is drawn into the gas stream even with a large liquid opening, it is possible to use a large inner diameter liquid capillary.

The disclosed nebulizer provides numerous advantages over existing nebulizer designs. Because the disclosed nebulizer can use a large inner diameter liquid capillary without negative impacts on its performance, it is highly suitable for introducing unfiltered liquid samples and liquid samples with a high salt content. The large inner diameter liquid capillary of the disclosed nebulizer more reliably handles samples that include particulates than current nebulizer designs. Moreover, the liquid capillary may preferably have the same inner diameter along the length of the capillary, without restrictions that narrow the capillary diameter. The inner diameter of the liquid capillary may be comparable to that of V-groove nebulizers, while the disclosed nebulizer still provides analytical performance that is superior to the performance of V-groove nebulizers and is comparable to the performance of concentric nebulizers.

Figure 6:
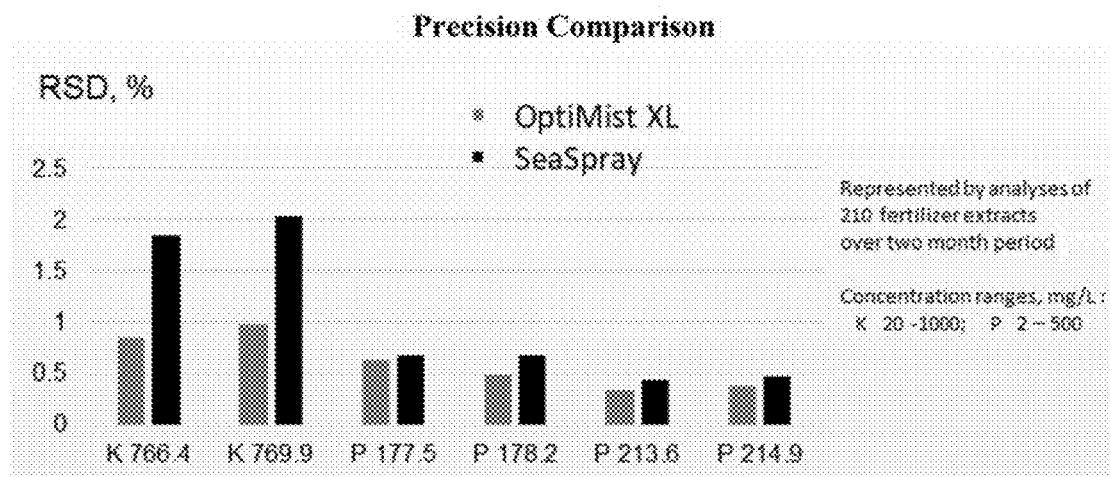
FIG. 6 shows a precision comparison between an embodiment of the disclosed nebulizer and a concentric nebulizer.

FIG. 6 shows a precision comparison between an embodiment of the disclosed nebulizer (first generation OptiMist XL®) and a concentric nebulizer (SeaSpray™).

Figure 7:
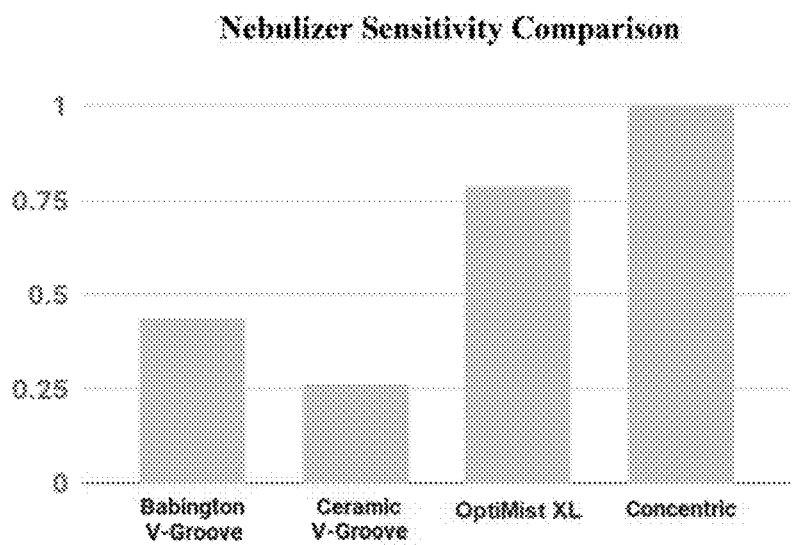
FIG. 7 shows a sensitivity comparison between two commercially available V-groove nebulizers, an embodiment of the disclosed nebulizer, and a commercially available concentric nebulizer.

FIG. 7 shows a sensitivity comparison between two commercially available V-groove nebulizers, an embodiment of the disclosed nebulizer (first generation OptiMist XL®), and a commercially available concentric nebulizer.

A large inner diameter liquid capillary without any restriction points is more resistant to plugging, and thus larger particulates present in a sample need not be filtered out prior to introduction of the sample into the nebulizer. The large inner diameter also provides more analytical reliability and greater nebulizer stability for samples with high quantities of salts or total dissolved solids. Even samples that are saturated with salts are unlikely to cause plugging via crystallization of the salts.

The inner diameter of the liquid capillary may preferably be between 0.50 mm and 2.5 mm, more preferably between 0.75 mm and 2.3 mm, and even more preferably between 0.90 mm and 2.0 mm. Commercially available nebulizers with large inner diameter liquid capillaries typically have a liquid capillary with a maximum inner diameter of 0.75-0.80 mm, and thus the disclosed nebulizer offers significantly enhanced sample analysis capabilities compared to current nebulizer designs.

The inner diameter of tubing that is used to deliver samples to a nebulizer is typically 0.50-0.75 mm. Thus any particulates with diameters above these values will not enter the nebulizer. As a result, the use of a large inner diameter liquid capillary according to the more preferred inner diameter ranges disclosed herein essentially eliminates plugging from particulates.

The distance between the edge of the liquid opening proximal to the gas orifice and the edge of the gas orifice proximal to the liquid opening may preferably be 0.50-4.3 mm, more preferably may be 1.1-4.3 mm, and even more preferably may be 1.2-1.9 mm.

In some embodiments, the distance between the edge of the liquid opening proximal to the gas orifice and the edge of the gas orifice proximal to the liquid opening may preferably be at least 1.0 mm.

In some embodiments, the nebulizer tip may be approximately perpendicular to the main axis of the nebulizer housing, as best illustrated in FIGS. 2, 4, and 5A-5C. In some alternate embodiments, the nebulizer tip may be set at an acute or obtuse angle with respect to the main axis of the nebulizer housing, as illustrated in FIG. 6.

Figure 8:
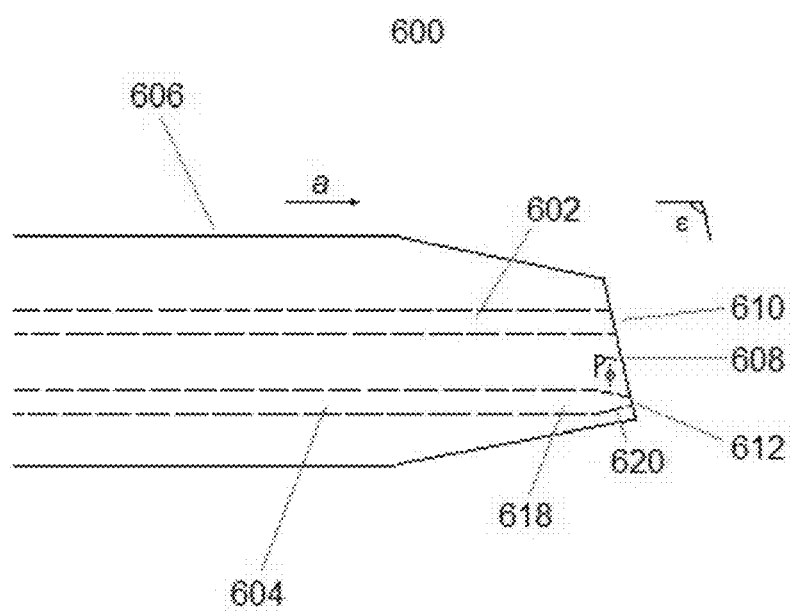
FIG. 8 illustrates a side view of an alternate embodiments of the disclosed nebulizer.

FIG. 8 illustrates a side view of an embodiment 600 of the disclosed nebulizer with an angled nebulizer tip. Nebulizer 600 includes a liquid capillary 602 and a gas capillary 604 aligned in the same direction and enclosed within a nebulizer housing 606. Nebulizer housing 606 ends at a nebulizer tip 608, where nebulizer tip 608 is set at an angle c with respect to the main axis a of the nebulizer housing. At the nebulizer tip 608, the liquid capillary 602 terminates in a liquid opening 610 and the gas capillary 604 terminates in a gas orifice 612. The gas capillary 604 includes a non-tapered body 618 and a tapered end 620. The tapered end 620 is tapered at an angle 4.

The end of the gas capillary in the alternate configuration shown in FIG. 6 may alternatively have an abrupt decrease in diameter between the non-tapered body and the end of the gas capillary, where the end of the gas capillary may be tapered, reverse-tapered, or non-tapered, analogous to the ends of the gas capillaries shown in FIGS. 5A-5C.

In embodiments such as the embodiment shown in FIG. 6, the angle (c) between the nebulizer tip and the main axis of the nebulizer housing may preferably be 110-125 degrees, and may more preferably be 115-120 degrees.

By setting the nebulizer tip at an angle with respect to the main axis of the nebulizer housing, the distance between the edge of the liquid opening proximal to the gas orifice and the edge of the gas orifice proximal to the liquid opening may be increased without increasing the overall diameter of the nebulizer housing. This allows for the improved thin film formation due to the larger contact surface area, resulting in more efficient energy transfer from the gas to the liquid. This will lead to increased atomization efficiency and the generation of smaller, more consistent aerosol particles. This leads to increased analytical precision and sensitivity.

The disclosed nebulizer has significantly better analytical precision and sensitivity than existing nebulizers that are capable of handling high solid content samples, such as V-groove nebulizers, and its analytical precision and sensitivity is comparable to the analytical precision and sensitivity of concentric nebulizers. The disclosed nebulizer also shows better long-term stability than existing V-groove nebulizers.

For certain difficult and chemically complex samples, the disclosed nebulizer offers superior analytical precision as compared to even concentric nebulizers. See, e.g., Table 1. This is extremely advantageous for a nebulizer capable of handling high solid content samples, as concentric nebulizers are typically considered to offer the best analytical precision and sensitivity for samples that do not have high solid content and are not otherwise prone to precipitation or crystallization that causes plugging. As the primary disadvantage of concentric nebulizers is the small and restricted diameters of both the liquid and gas capillaries that leads to plugging from even small particles, the development of a nebulizer that is capable of both handling high solid content samples and offering a similar level of analytical precision and sensitivity as concentric nebulizers is highly advantageous.

Methods of introducing a sample into an instrument using the disclosed nebulizer are also disclosed herein. The method may comprise: (1) introducing a liquid into the liquid capillary; (2) introducing a gas into the gas capillary to generate a gas stream exiting the gas orifice; (3) drawing the liquid into the gas stream by induction; (4) atomizing the liquid that is drawn into the gas stream to generate atomized liquid particles in the gas stream; (5) removing atomized liquid particles that are above a threshold diameter from the gas stream; and (6) introducing the gas stream containing atomized liquid particles with a diameter below or equal to the threshold diameter into an instrument.

In some embodiments, the disclosed methods may be suitable for sample introduction when the input gas pressure is 36-39 psi or 49-52 psi at a flow rate of approximately 1.0 L/min, as is typical for various spectroscopic applications for which the methods are suited.

The robust design of the disclosed nebulizer minimizes required maintenance thereof and also suggests the conclusion that the disclosed nebulizer will have an extended life expectancy.

The previous description of the disclosed embodiments is provided to enable any person skilled in the art to make or use the invention disclosed herein. Although the various inventive aspects are disclosed in the context of certain illustrated embodiments, implementations, and examples, it should be understood by those skilled in the art that the invention extends beyond the specifically disclosed embodiments to other alternative embodiments and/or uses of the invention and obvious modifications and equivalents thereof. In addition, while a number of variations of various inventive aspects have been shown and described in detail, other modifications that are within their scope will be readily apparent to those skilled in the art based upon reviewing this disclosure. It should be also understood that the scope of this disclosure includes the various combinations or sub-combinations of the specific features and aspects of the embodiments disclosed herein, such that the various features, modes of implementation, and aspects of the disclosed subject matter may be combined with or substituted for one another. The generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

All references cited herein are hereby expressly incorporated by reference.

What is claimed is:

1. A nebulizer comprising:
   a liquid capillary enclosed within a housing; and
   a gas capillary enclosed within the housing, wherein the gas capillary comprises a body and an end;
   wherein the housing comprises a tip that is substantially parallel to a cross-section of the liquid capillary and is substantially parallel to a cross-section of the gas capillary,
   wherein the liquid capillary comprises an opening at the tip and the gas capillary comprises an orifice at the tip,
   wherein the body of the gas capillary has a first diameter and the orifice has a second diameter that is less than the first diameter,
   wherein the end of the gas capillary is not more than 2.5 mm in length,
   wherein the surface of the tip is roughened, and
   wherein the distance between the edge of the liquid opening proximal to the gas orifice and the edge of the gas orifice proximal to the liquid opening is at least 1.0 mm.

2. The nebulizer of claim 1, wherein the nebulizer is formed from glass.

3. The nebulizer of claim 1, wherein the nebulizer is formed from quartz.

4. The nebulizer of claim 1, wherein the nebulizer is formed from one or more polymers.

5. The nebulizer of claim 1, wherein the nebulizer is formed from one or more metals or alloys.

6. The nebulizer of claim 1, wherein the nebulizer is formed from two or more materials selected from the group consisting of glass, quartz, polymers, metals, and alloys.

7. The nebulizer of claim 1, wherein the body and the end of the gas capillary are both non-tapered, and wherein the diameter of the end is equal to the second diameter.

8. The nebulizer of claim 1, wherein the body or the gas capillary is non-tapered and the end of the gas capillary is tapered, wherein the diameter of the end is equal to the first diameter at an interface between the body and the end, and wherein the diameter of the end is equal to the second diameter at the orifice.

9. The nebulizer of claim 1, wherein the body of the gas capillary is non-tapered and the end of the gas capillary is reverse-tapered.

10. The nebulizer of claim 1, wherein the end of the gas capillary is not more than 1.0 mm in length.

11. The nebulizer of claim 10, wherein the body and the end of the gas capillary are both non-tapered, and wherein the diameter of the end is equal to the second diameter.

12. The nebulizer of claim 10, wherein the body of the gas capillary is non-tapered and the end of the gas capillary is tapered, wherein the diameter of the end is equal to the first diameter at an interface between the body and the end, and wherein the diameter of the end is equal to the second diameter at the orifice.

13. The nebulizer of claim 10, wherein the body of t e gas capillary is non-tapered and the end of the gas capillary is reverse-tapered.

14. A nebulizer comprising:
   a liquid capillary enclosed within a housing; and
   a gas capillary enclosed within the housing, wherein the gas capillary comprises a body and an end;
   wherein the housing comprises a tip that is substantially parallel to a cross-section of the liquid capillary and is substantially parallel to a cross-section of the gas capillary,
   wherein the liquid capillary comprises an opening at the tip and the gas capillary comprises an orifice at the tip,
   wherein the body of the gas capillary has a first diameter and the orifice has a second diameter that is less than the first diameter,
   wherein the end of the gas capillary is not more than 2.5 mm in length,
   wherein the surface of the tip is roughened, and
   wherein the distance between the edge of the liquid opening proximal to the gas orifice and the edge of the gas orifice proximal to the liquid opening is sufficiently large such that a sample liquid in the liquid capillary will exit the liquid capillary and form a thin film on a portion of the tip when a gas stream is exiting from the gas orifice.

15. The nebulizer of claim 14, wherein the body and the end of the gas capillary are both non-tapered, and wherein the diameter of the end is equal to the second diameter.

16. The nebulizer of claim 14, wherein the body of the gas capillary is non-tapered and the end of the gas capillary is tapered, wherein the diameter of the end is equal to the First diameter at an interface between the body and the end, and wherein the diameter of the end is equal to the second diameter at the orifice.

17. The nebulizer of claim 14, wherein the body of the gas capillary is non-tapered and the end of the gas capillary is reverse-tapered.

18. The nebulizer of claim 14, wherein the end of the gas capillary is not more than 1.0 mm in length.

19. The nebulizer of claim 18, wherein the body and the end of the gas capillary are both non-tapered, and wherein the diameter of the end is equal to the second diameter.

20. The nebulizer of claim 18, wherein the body of the gas capillary is non-tapered and the end of the gas capillary is tapered, wherein the diameter of the end is equal to the first diameter at an interface between the body and the end, and wherein the diameter of the end is equal to the second diameter at the orifice.

* * * * *